United States Patent [19]

Sunderland

[11] Patent Number: 5,558,898

[45] Date of Patent: Sep. 24, 1996

[54] CONTINUOUS METHOD OF PRODUCING MASA FLOUR

[75] Inventor: Robert D. Sunderland, Sabetha, Kans.

[73] Assignee: Wenger Manufacturing Inc., Sabetha, Kans.

[21] Appl. No.: 309,199

[22] Filed: Sep. 20, 1994

[51] Int. Cl.⁶ ........................................................ A23L 1/00
[52] U.S. Cl. .......................... 426/626; 426/456; 426/459; 426/463
[58] Field of Search .................................. 426/626, 456, 426/459, 463

[56] References Cited

U.S. PATENT DOCUMENTS

| | | |
|---|---|---|
| 2,472,971 | 6/1949 | Hansen . |
| 3,031,305 | 4/1962 | Weinecke . |
| 3,264,113 | 8/1966 | Barta et al. . |
| 4,378,376 | 3/1983 | Wagner et al. ........................... 426/41 |
| 4,555,409 | 11/1985 | Hart . |
| 4,573,278 | 3/1986 | Ruiz-Avilla . |
| 4,943,438 | 7/1990 | Rosenthal ................................. 426/92 |
| 5,176,931 | 1/1993 | Herbster . |

OTHER PUBLICATIONS

Mistry et al.; Dry Milling and Physical Characteristics of Alkali–Debranned Yellow Dent Corn, Cereal Chemistry 69(1):82–84 (1992).

Timmins, The Microscopic Examination of Micronized and Extruded Cereals and Cereal Products; The Proctor Department of Food Science, The University of Leeds, Spring, 1989.

*Primary Examiner*—Esther Kepplinger
*Assistant Examiner*—Choon P. Koh
*Attorney, Agent, or Firm*—Hovey, Williams, Timmons & Collins

[57] ABSTRACT

A short-time low-pollution method for preparing masa flour is provided wherein whole grain is first partially cooked in a hot alkaline treating solution to achieve at least about 15% gelatinization and loosening of the bran fraction of the grain. The partially cooked grain is then debranned and is subjected to a flash dehydration for quickly subdividing and reducing the moisture content of the grain. The dehydrated grain is then milled to create an acceptable masa flour.

27 Claims, 2 Drawing Sheets

CONTINUOUS METHOD OF PRODUCING MASA FLOUR

BACKGROUND OF THE INVENTION

1. Field of the Invention

The present invention is broadly concerned with a method for the preparation of masa flour which eliminates many of the costly, time-consuming, pollution causing steps conventionally carried out in the preparation of such flours. More particularly, it is concerned with a masa preparation method wherein debranned, moisturized and partially cooked grain (e.g., corn or wheat) is subjected to a flash dehydration process in order to quickly dehydrate the debranned grain, which can then be milled into an acceptable masa flour. In the flash dehydration, high velocity hot air currents having a temperature of from about 600°–1000° F. are employed for the rapid grain dehydration.

2. Description of the Prior Art

Masa flour, typically made using food grade corn or wheat, is produced in tremendous quantities in the United States and around the world. Such flour is used to fabricate such familiar products as tortilla chips and taco shells.

Despite the demand for masa flour, for the most part it is prepared using very old and time honored techniques. In the first step, whole kernel corn is cooked in a mixture of water and 1% lime up to a temperature of 175°–205° F., depending upon the hardness of the starting corn and other factors. The corn is then allowed to steep in the lime water for a period of 8–12 hours, in order to allow the lime to penetrate, loosen and partially dissolve the pericarp or bran fraction of the corn.

The steeped corn is then passed through a corn washer, comprising a perforated, rotatable cylinder equipped with internal water jets, in order to complete the removal of bran and to reduce the pH of the corn to about 6.5–7.5.

In the next step, the washed, debranned corn is passed through a stone grinder to mill the corn to a desired particle size and thus complete the flour preparation. The flour may then be appropriately dried for storage, sale and use, or used directly. Masa products are typically prepared by forming a 1:1 (w/w) dough of the masa flour and water, followed by forming the dough through an extruder or other like device, followed with subsequent drying, equilibrating and frying. The final fried masa products are then cooled, salted and packaged.

The conventional masa flour preparation technique presents a number of serious difficulties. First of all, the time required to process the flour is considerable, owing principally to the need for extended steeping. Secondly, the established method has serious ecological consequences, in that the steeping water contains considerable quantities of objectionable dissolved pericarp and soluble starches. Removal of these organic substances from the steeping water is an expensive proposition for masa flour producers, and some flour plants are reported to incur expenses of many thousand dollars per month simply to remove these pollutants from their process streams.

U.S. Pat. No. 5,176,931 represents a new approach to masa flour production. This patent describes a process wherein, after alkali metal hydroxide treatment of grain, the grain is subjected to near infrared radiation and subsequent milling. By this means, process times are significantly reduced as compared with the traditional process. However, the technique described in the '931 patent can be difficult to control in commercial scale production, particularly during the near IR treatment step.

SUMMARY OF THE INVENTION

The present invention provides an improved, short-time method for masa flour production which eliminates many of the problems encountered in conventional processing. Broadly speaking, the method of the invention involves first contacting whole grain (typically wheat or corn, but virtually any grain could be used) with a heated alkaline solution for a period of time to partially cook the grain and loosen the pericarp or bran fraction thereof. The bran fraction is then essentially completely separated to yield debranned grain. The latter product is flash dehydrated using high velocity, high temperature air currents until the debranned grain has a moisture content of less than about 20% by weight MCWB. This dehydrated and debranned grain is then reduced by milling to a masa flour which may optionally be cooled and packaged.

In more detail, the heated alkaline solution used in the process of the invention should have a temperature of at least about 180° F., and a pH of at least about 9. Generally, the solution is made by dispersing an alkali metal or alkaline earth hydroxide or salt in water, with calcium hydroxide being the most preferred agent. This treating solution is used in excess, and is contacted with the grain for a period of at least about 20 minutes, in order to achieve a partial gelatinization of the grain on the order of at least about 15%.

The partially cooked grain is then passed through a conventional washer/abrader having an elongated, rotatable, perforated reel with internal water jets. The action of the washer/abrader serves to essentially completely remove the bran fraction leaving a cooled, debranned grain product.

The flash dehydration advantageously makes use of incoming hot air currents which are passed through the grain during a hammermill subdivision thereof. Such hot air currents should have a temperature of from about 600°–1000° F. Total residence time of the grain within the flash dehydrator is on the order of 2–15 seconds.

In another aspect of the invention, an improved apparatus for partial cooking of whole grain and loosening the bran fraction thereof is provided. This apparatus includes an elongated, generally horizontally disposed body including inlets for whole grain and treating solution, and a spaced product outlet. An elongated reel assembly is located within the body and includes an outer perforate screen and helical flighting inboard of the outer screen. Means is provided for heating and maintaining the temperature of the treating solution within the body. In use, the reel assembly is rotated in order to assure even heating, partial cooking and moisturization of the incoming grain product, which is then discharged for downstream processing.

DETAILED DESCRIPTION OF THE PREFERRED EMBODIMENT

Figure 1:
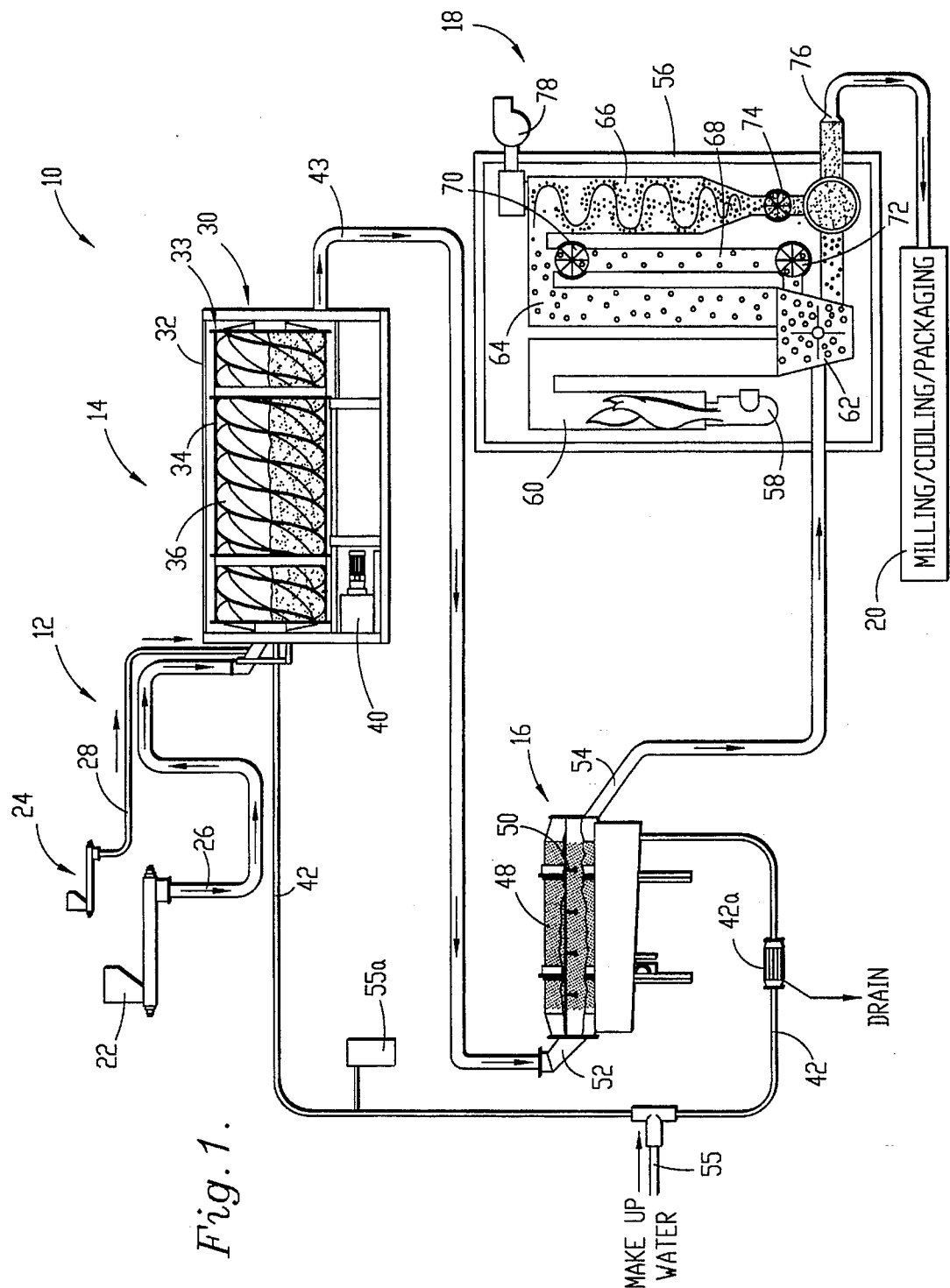
FIG. 1 is a schematic flow diagram illustrating the preferred apparatus and process scheme for the production of masa flour in accordance with the invention.

Turning first to the drawings, an overall apparatus 10 is illustrated in FIG. 1 for the continuous production of masa-type flours from grain sources. Broadly speaking, the apparatus 10 includes a feeder assembly 12 operatively coupled with a continuous grain cooker 14. A grain washer 16 is coupled downstream of cooker 14, and a fluidized bed flash dehydrator 18 is connected to the output of washer 16. A conventional two-stage milling, cooling and packaging assembly 20 is located downstream of dehydrator 18.

In more detail, the feeder assembly 12 includes conventional screw-type grain and alkali feeders 22, 24 coupled via conduits 26, 28 to the input of cooker 14. As those skilled in the art will readily understand, the feeders 22, 24 are designed to feed grain and alkali at a controlled rate into the continuous cooker 14.

The cooker 14 (see FIG. 2) includes an upright frame assembly 30 supporting an elongated, horizontally disposed, closed metallic housing 32 having an axially rotatable reel 33 therein. The latter includes an elongated, perforated ⅛" outer screen 34 having helical flighting 36 along the inner surface thereof. A secondary, inboard perforated ⅛" screen 38 is tack welded to the inner surface of flighting 36 as shown, and is relieved as at 39a, 39b adjacent the inlet and outlet ends of the reel 33. Reel 33 is axially rotated within housing 32 by means of conventional drive assembly 40. At the exit of reel 38, a conventional bucket strainer is provided, serving to deliver concentrated grain to the output of the cooker. A pair of steam heating coils 41 are also situated within housing 32 as shown, in order to heat and maintain the temperature of water within the cooker.

Figures 2, 3:
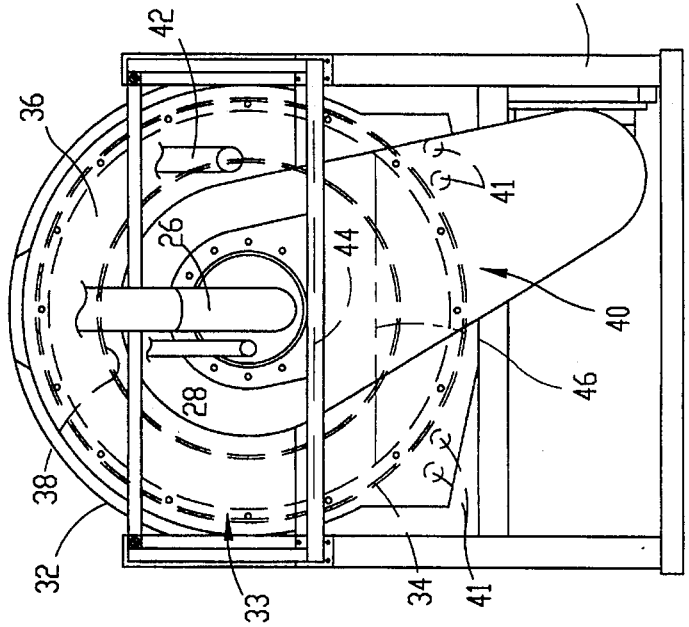
FIG. 2 is an end view partially in phantom and illustrating the construction of the grain cooker used in the preferred process.
FIG. 3 is an essentially schematic, fragmentary view further illustrating the construction of the continuous grain cooker apparatus used in the process of the invention.

As illustrated in FIG. 2, grain and alkali input conduits 26, 28 feed directly into the interior of reel 33. In a similar fashion, a water line 42 is likewise operatively coupled to the cooker 14 for delivery of water into the interior of housing 32. A water/grain output line 43 is operatively coupled to the end of housing 32 remote from input lines 26, 28 and 42. As will be explained in greater detail hereinafter, during typical operation, the water level within housing 32 is shown at 44, whereas the grain level within screen 34 is shown at 46.

The grain washer and abrader 16 is of conventional design and includes an elongated, rotatable, perforated reel 48 with internal water jets 50. An inlet transition 52 is coupled with line 43 as shown, for delivery of the output from cooker 14 to the interior of reel 48. In the washer device 16, the loosened pericarp of the grain is detached and strained for subsequent processing or disposal. The resultant debranned grain is then ready for flash dehydration and for this purpose passes into output line 54 having a conventional inline filter 42a. Separated water from the device 16 is delivered via line 42 back to cooker 14. Makeup water may be added as needed through input line 55, and the water stream is heated by means of heater 55a before delivery to washer 14.

Flash dehydrator 18 includes an upright housing 56 adapted to receive and flash dehydrate the abraded, moisturized grain from device 16. To this end, the housing 56 includes a high capacity (e.g., 1.8M BTU) gas fired burner 58 which feeds directly into a baffled equilibration tunnel 60. A hammermill 62 is disposed at the end of tunnel 60 remote from burner 58 and is adapted to receive both incoming moisturized grain and the hot dehydration air generated by burner 58. The output of hammermill 62 is connected with an upright drying tower 64 which feeds to a conventional cyclone separator 66. An intermediate recycle conduit 68, equipped with airlocks 70, 72 may be employed for recycling oversized material from the top of tower 64 back to hammermill 62 for reprocessing. The lower end of separator 66 has an airlock 74, which feeds to output line 76. A negative pressure fan 78 is operatively coupled to the upper end of separator 66 and serves to induce airflow through tunnel 60, hammermill 62 and tower 64. The dehydrator 18 is of the type described in U.S. Pat. No. 4,573,278, incorporated by reference herein.

The milling, cooling and packaging assembly 20 is operatively connected to output line 76 as shown, and serves in the usual fashion to reduce the dehydrated grain to an appropriate particle size with subsequent ambient air cooling and packaging. The milling section would conventionally be a two-stage mill.

In normal operations using apparatus 10, the desired grain to be processed is fed through feeder 22 and line 26 into cooker 14. At the same time, heated water is directed through line 42 into the cooker, along with alkali. The incoming water temperature is at least about 180° F., and more preferably from about 190°–212° F.; this water temperature is maintained by means of the steam coils 41 within housing 32. Generally speaking, an excess of alkaline solution is provided in cooker 14, relative to the amount of grain. Preferably, at least about 200% by weight of alkaline solution is provided, based upon the amount of grain taken as 100% by weight; more preferably, this ratio should be from about 250–280% by weight alkaline solution, as compared with the grain taken at 100% by weight. The alkali employed is typically calcium hydroxide, although other types of alkali metal or alkaline earth metal hydroxides could be used. The pH of the processed water within cooker 14 should be at least about 9, and more preferably from about 10–12. The residence time of the grain within cooker 14 is variable, but generally should be at least about 20 minutes. In actual practice, this residence time usually ranges from about 20–60 minutes, most preferably about 40 minutes. The purpose of treatment within cooker 14 is to loosen the pericarp of the grain and to partially hydrate and cook or gelatinize the grain. In preferred practice, processing within cooker 14 should be sufficient to achieve at least about 15% gelatinization of the grain, and more preferably from about 20–45% gelatinization. The moisture content of the grain exiting cooker 14 should be from about 15–50% by weight MCWB (moisture content wet basis), and more preferably from about 35–50% by weight MCWB. The temperature of the grain leaving cooker 14 is generally from about 160°–210° F.

The output from cooker 14 passes via conduit 43 into washing device 16. In this device, the loosened pericarp is removed from the grain and separated. For this purpose, low pressure ambient temperature water is directed through the jets 50 onto the rotating grain within reel 48. The pericarp is then strained and the resulting processed grain is passed through output line 54 into dehydrator 18. At the same time, the separated alkaline solution is passed through line 42 for filtration, addition of makeup water as needed, preliminary heating, and passage back into cooker 14. The moisture content of the grain leaving washer 16 is generally slightly lower than that of the grain from cooker 14. Usually, this reduction is from about 2–8%. The temperature of the grain leaving washer 16 is less than 80° F.

The moisturized and debranned grain is delivered through line 54 directly into hammermill 62. At the same time, high temperature induced air currents are directed into the hammermill via fan 78 and burner 58. The temperature of the incoming air stream is from about 600°–1000° F., and more preferably from about 700°–900° F. This air is directed into the hammermill at a relatively high velocity on the order of from about 1,000–15,000 cfm, and more preferably from about 2,000–12,000 cfm. In preferred practice, the amount of heated air employed should be from about 0.5–7.5 cf/lb. of incoming wet grain, and more preferably from about 1.0–6.0 cf/lb of incoming wet grain. The hammermill 62 serves to reduce the incoming grain to a maximum particle size of less than about 3 mm, and preferably smaller. In this fashion, the total surface area of the grain is very substantially increased. At the same time,, the grain is subjected to significant flash dehydration within the hammermill. The output from hammermill 62 passes upwardly through tower 64, being conveyed by the induced air currents within the dehydrator 18. As necessary, the airlocks 70, 72 may be operated for recycling purposes. Finished product is delivered to separator 66. The incoming air temperature to the separator 66, referred to as the process temperature, is from about 160°–320° F., and more preferably from about 180°–300° F. The output, from separator 66 is in the form of subdivided, substantially dried grain, typically having a moisture content of from about 8–15% by weight MCWB, and more preferably from about 10–12% by weight MCWB. The temperature of this output material is normally from about 100°–150° F., and more preferably from about 110°–140° F. The total residence time of the debranned grain within dehydrator 18 is from about 2–15 seconds, more preferably from about 5–12 seconds.

In the final assembly 20, the grain is further processed by a two-stage milling to achieve a standard flour particle size. It is then cooled and is ready for packaging..

EXAMPLES

The following examples illustrate preferred aspects of the present invention. It is to be understood, however, that these examples are presented by way of illustration only, and nothing therein should be taken as a limitation upon the overall scope of the invention.

A total of four processing runs were carried out, three using yellow dent corn, and one using hard red winter wheat. The three corn runs were carried out under identical processing conditions, except that retention times in the cooker 14 were varied. In particular, in all four runs, water, lime and grain were delivered to the cooker 14, and the grain was retained in the cooker for measured amounts of time. The water temperature within the cooker 14 was maintained at 212° F., and lime addition was at 3–3.5% by weight. After the product exited the cooker 14, it was immediately washed with 30 psi, ambient temperature tap water. The washed product was cooled to a temperature below 80° F. and then collected in drums. The collected products were then processed through the flash dehydrator, with subsequent milling and cooling.

In particular, the measured conditions within the flash dehydrator for these four samples were as follows. Temperature of incoming hot air currents, 716° F.; process temperature, 290° F.; agitator load, 30%; fan damper position, 25% open; burner position, 15% open; estimated residence or dwell time in flash dehydrator, 6 seconds.

The corn samples after flash dehydration were milled to two particle sizes, namely: a coarse milling with 50% through a 40-mesh screen, and 50% through a 60-mesh screen; and a fine milling with 100% through 60-mesh. The wheat sample was fine ground only. This gave a total of eight samples of flour for evaluation, a coarse and fine milling of the three corn runs, the fine grind wheat run, and a control corn masa flour from a commercial source.

The following table sets forth other processing conditions and product parameters for these tests.

|  | Corn | Corn | Corn | Wheat |
| --- | --- | --- | --- | --- |
| Cooker Residence Time (Min.) | 18.6 | 27.0 | 40.0 | 18.6 |
| Moisture Content From Cooker (% by weight MCWB) | 39.5 | 43.1 | 46.4 | 38.7 |
| Temperature of Product From Cooker (°F.) | 202 | 207 | 207 | 205 |
| Moisture Content From Washer (% by weight MCWB) | 33.7 | 38.0 | 39.7 | — |
| Moisture Content from Dehydrator (% by weight MCWB) | 10.8 | 12.6 | 13.0 | 11.6 |
| Final Flour Water Absorption Index[1] | 3.23 | 3.72 | 3.61 | 3.53 |
| Final Flour Water Solubility Index[2] (%) | 5.01 | 4.97 | 5.06 | 5.97 |
| Final Flour Reducing Sugar Content (Mg Maltose/10 g Product)[3] | 114.5 | 93.0 | 103.5 | 90.0 |
| Final Flour pH[4] | 6.63 | 6.62 | 6.60 | 7.75 |
| Final Flour Moisture Content (% by weight MCWB)[5] | 9.92% | 7.18% | 7.96% | 7.97% |

[1]WAI values obtained by grinding the product through a 60-mesh screen, adding 2.5 g of the ground product (dry basis) to 30 ml water and allowing the mixture to stand at room temperature for 1-½ hours with stirring or agitation every 30 minutes; sample is then centrifuged for 20 minutes, the supernate is decanted and the wet gel is weighed; the weight of this gel in grams is divided by 2.5 g to give the WAI. The dry corn masa flour control had a WAI of 3.52
[2]WSI values obtained by oven drying the supernate described in footnote 1 at 110° C. The dried solids are then weighed and the weight in grams is divided by 2.5 g and the result is multiplied by 100 to give the WSI. The dry corn masa flour control had a WSI of 6.55%
[3]Reducing sugar content values obtained using A.A.C.C. (American Association of Cereal Chemists) Method 80-60; the dry corn masa flour control had a value of 95 mg
[4]pH values obtained using A.A.C.C. Method 02-51; the dry corn masa flour control had a pH of 6.75
[5]Moisture content values obtained using A.A.C.C. Method 44-15; the dry corn masa flour control had a 9.62% by weight MCWB The eight flours were evaluated by rehydration, conventional sheeting, preliminary toasting and final frying. The flours produced by the method of the invention gave acceptable aroma and flavor characteristics, and the fine flours rehydrated and sheeted easily. The coarse flour made chips having an unacceptable rough texture, as compared with conventional masa chips. The fine flours gave fully acceptable flour-type soft tortillas. However, when fried these products absorbed too much oil and did not have completely acceptable texture and color. It was concluded that these frying and color problems derived from use of too much lime in the initial processing; this is believed to deleteriously affect both color and frying quality.

I claim:

1. A method of producing masa flour, comprising the steps of:

providing a quantity of whole grain;

contacting said whole grain with a heated alkaline solution for a period of time to partially cook the grain and loosen the bran fraction thereof;

separating said bran fraction from said grain to yield debranned grain;

flash dehydrating said debranned grain by passing hot air currents therethrough until the debranned grain has a moisture content of up to about 20% by weight; and reducing the flash dehydrated and debranned grain to a masa flour.

2. The method of claim 1, including the step of contacting said whole grain with said heated alkaline solution for a period of at least about 20 minutes.

3. The method of claim 2, said period being from about 20–60 minutes.

4. The method of claim 1, said heated alkaline solution having temperature of at least about 180° F.

5. The method of claim 4, said temperature being from about 190°–212° F.

6. The method of claim 1, said heated alkaline solution having a pH of at least about 9.

7. The method of claim 6, said pH being from about 10–12.

8. The method of claim 1, including the step of contacting said grain with at least about 200% by weight of said heated alkaline solution, based upon the amount of whole grain taken as 100% by weight.

9. The method of claim 8, wherein said whole grain is contacted with about 250–280% by weight of said heated alkaline solution, based upon the amount of whole grain taken as 100% by weight.

10. The method of claim 1, said heated alkaline solution comprising an alkali metal or alkaline earth metal hydroxide dispersed in water.

11. The method of claim 10, said heated alkaline solution comprising calcium hydroxide dispersed in water.

12. The method of claim 1, said contacting step being carried out until said grain is at least about 15% gelatinized.

13. The method of claim 12, said contacting step being carried out until said grain is from about 20–45% gelatinized.

14. The method of claim 1, the moisture content of said grain after said contacting step being from about 15–50% by weight.

15. The method of claim 14, said moisture content being from about 35–50% by weight.

16. The method of claim 1, the temperature of said grain after said contacting step being from about 160°–210° F.

17. The method of claim 16, wherein said temperature is from about 700°–900° F.

18. The method of claim 1, said hot air currents having a velocity of from about 1,000–15,000 cfm.

19. The method of claim 18, said velocity being from about 2,000–12,000 cfm.

20. The method of claim 1 said flash dehydration step being carried out until the moisture content of the debranned grain is from about 8–15% by weight.

21. The method of claim 20, said moisture content being from about 10–12% by weight.

22. The method of claim 1, the temperature of said grain after said flash dehydration step being from about 100°–150° F.

23. The method of claim 1, including the step of subdividing said debranned grain during at least a portion of the time that said hot air currents are contacting the debranned grain.

24. The method of claim 1, wherein said hot air currents have a temperature of from about 600°–1000° F.

25. The method of claim 1, including the step of flash dehydrating said debranned grain for a period of from about 2–15 seconds.

26. The method of claim 22, said period being from about 5–12 seconds.

27. The method of claim 1, said residence time being from about 5–12 seconds.

* * * * *